United States Patent
Shigezumi et al.

(10) Patent No.: US 8,968,953 B2
(45) Date of Patent: Mar. 3, 2015

(54) SOLID OXIDE FUEL CELL

(75) Inventors: Tsukasa Shigezumi, Kitakyushu (JP);
Toshiharu Ooe, Kitakyushu (JP);
Katsuhisa Tsuchiya, Kitakyushu (JP);
Kiyotaka Nakano, Kitakyushu (JP);
Yoshiyuki Kawamura, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 206 days.

(21) Appl. No.: 13/262,152

(22) PCT Filed: Mar. 31, 2010

(86) PCT No.: PCT/JP2010/055912
§ 371 (c)(1),
(2), (4) Date: Sep. 29, 2011

(87) PCT Pub. No.: WO2010/114045
PCT Pub. Date: Oct. 7, 2010

(65) Prior Publication Data
US 2012/0015273 A1     Jan. 19, 2012

(30) Foreign Application Priority Data
Mar. 31, 2009    (JP) .................................. 2009-087460

(51) Int. Cl.
*H01M 8/04*        (2006.01)
(52) U.S. Cl.
USPC ........... 429/444; 429/428; 429/430; 429/431; 429/432; 429/443
(58) Field of Classification Search
None
See application file for complete search history.

(56) References Cited

U.S. PATENT DOCUMENTS
2004/0106022 A1    6/2004   Saito et al.

FOREIGN PATENT DOCUMENTS

| JP | 05-003041 A | 1/1993 |
|---|---|---|
| JP | 2003-217627 A | 7/2003 |
| JP | 2004-179003 A | 6/2004 |
| JP | 2007-059129 A | 3/2007 |
| JP | 2007-087686 A | 4/2007 |

(Continued)

OTHER PUBLICATIONS machine translation of JP 2007-273252, retrieved from <http://www19.ipdl.inpit.go.jp/PA1/cgi-bin/PA1DETAIL> on Jul. 9, 2013.*

(Continued)

*Primary Examiner* — Cynthia K. Walls
(74) *Attorney, Agent, or Firm* — Brinks Gilson & Lione

(57) ABSTRACT

A solid oxide fuel cell capable of maintaining performance over a long time period by appropriately changing fuel cell module operating conditions. The present invention is a solid oxide fuel cell (1), having a fuel cell module (2), a fuel supply device (38), an oxidant gas supply device (45), and a controller (110) for controlling the amount of fuel supplied from the fuel supply device; the controller is furnished with a degradation determining circuit (110*a*) for determining degradation in the fuel cell module and a degradation response circuit (110*b*) for changing fuel cell module operating conditions based on the degradation determination by the degradation determining circuit; the degradation determination stores fuel cell module operating results arising from the operating conditions changed by the degradation response circuit, and executes further degradation determination based on the stored operating results.

11 Claims, 11 Drawing Sheets

(56) References Cited

FOREIGN PATENT DOCUMENTS

| JP | 2007-087756 A | 4/2007 |
|---|---|---|
| JP | 2007-273252 A | 10/2007 |
| JP | 2008-262875 A | 10/2008 |
| JP | 2009-021194 A | 1/2009 |
| JP | 2009-059556 A | 3/2009 |

OTHER PUBLICATIONS

English translation of JP 2007-273252, received on Nov. 26, 2013.*
machine translation of JP 2009-021194, retrieved from<http://www19.ipdl.inpit.go.jp/PA1/cgi-bin/PA1INDEX> on Aug. 9, 2014.*
International Search Report for International Application No. PCT/JP2010/055912, dated May 18, 2010, 2 pages.

* cited by examiner

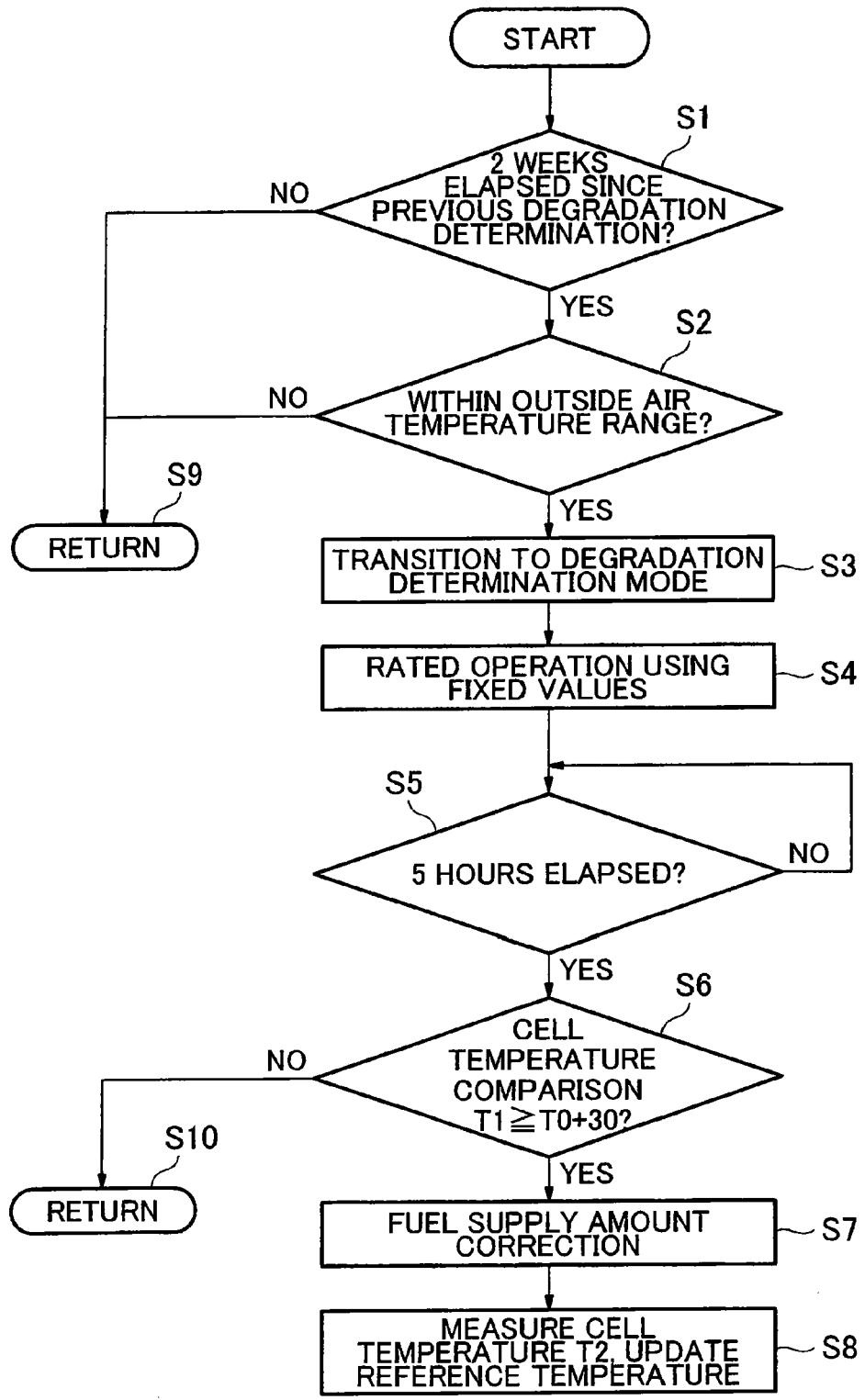

SOLID OXIDE FUEL CELL

TECHNICAL FIELD

The present invention relates to a solid oxide fuel cell.

BACKGROUND ART

Solid oxide fuel cells ("SOFCs" below) operate at relatively high temperatures, using an oxide ion conducting solid electrolyte as an electrolyte, with electrodes placed on both sides thereof, and with fuel gas supplied to one side thereof and oxidizer (air, oxygen, or the like) supplied to the other side thereof.

In such SOFCs, steam or $CO_2$ is produced by the reaction between oxygen ions passed through the oxide ion conducting solid electrolyte and fuel, thereby generating electrical and thermal energy. The electrical energy is extracted from the SOFC, where it is used for various electrical purposes. At the same time, thermal energy is used to raise the temperature of the fuel, SOFC, oxidant, and the like.

It is known that fuel cell units degrade with usage over long time periods. Unexamined Patent Application 2007-87756 (Patent Document 1) sets forth a solid oxide fuel cell. It is stated that in this fuel cell, degradation of the fuel cell units can be reduced by adjusting the flow rate of fuel.

A fuel supply amount control device, fuel supply amount control method, and electrical power supply system are also set forth in Unexamined Patent Application 2003-217627 (Patent Document 2). In this fuel supply amount control device, the amount of fuel supplied is compensated when the electrical power extractable from a predetermined amount of fuel supplied decreases due to degradation of fuel cell units.

PRIOR ART REFERENCES

Patent References

Patent Document 1: Unexamined Patent Application 2007-87756
Patent Document 2: Unexamined Patent Application 2003-217627

SUMMARY OF THE INVENTION

Problems the Invention Seeks to Resolve

However, fuel cell units are in general extremely slow to respond to changes in operating conditions, therefore it requires on the order of several hours before changes in operating conditions such as fuel supply amount and the like are reflected in output power. Moreover, the output power from the fuel cell units is affected by an extremely large number of factors such as outside air temperature, outside air humidity, operating history, etc., making it even more difficult to know the state of the fuel cell units.

It is therefore extremely difficult to continuously compensate operating conditions such as fuel supply amounts and the like based on the degradation of fuel cell units through up-to-the-minute detection when such fuel cell units degrade. In addition, it can occur that through false determinations of degradation in fuel cell units, inappropriate compensation of operating conditions results in further promotion of fuel cell units degradation, and when such inappropriate compensation of operating conditions is carried out continuously, the risk of promoting degradation of the fuel cell units becomes even higher.

Conversely, it is possible to imagine predicting in advance the degradations to fuel cell units which could occur, then implementing compensation under pre-set operating conditions in accordance with fuel cell units operating times, etc. However, there is a great deal of variation between fuel cells units, and the types of compensation required also differ according to operating history in addition to operating time, so it is difficult to pre-set effective compensation of operating conditions, and if inappropriate compensation is applied, degradation of the fuel cell units may be promoted.

Therefore the present invention has the object of providing a solid oxide fuel cell capable of maintaining performance over a long time period by appropriately changing fuel cell module operating conditions.

Means for Resolving the Problems

In order to resolve the problems above, the present invention is a solid oxide fuel cell, having a fuel cell module furnished with multiple fuel cell units; a fuel supply device for supplying fuel to the fuel cell module; an oxidant gas supply device for supplying oxidant gas to the fuel cell module; and a controller for controlling the operation of the fuel cell module by controlling the amount of fuel supplied from the fuel supply device; wherein the controller is furnished with a degradation determining circuit for determining degradation in the fuel cell module from predetermined measurement values obtained from the results of fuel cell module operation, and with a degradation response circuit for changing fuel cell module operating conditions to respond to degradation when the degradation determining circuit determines that there has been degradation of a fuel cell module; furthermore, when the degradation determining circuit determines degradation in the fuel cell module, the controller operates the fuel cell module under operating conditions changed by the degradation response circuit and thereafter obtains and stores predetermined measurement values obtained from the operating results of the fuel cell module under the changed operating conditions, and by comparing the stored measurement values with subsequently newly acquired predetermined measurement values, determines on the one hand the additional amount of progress in the degradation of the fuel cell module occurring after the operating conditions changed, while on the other hand does not update the stored measurement value if it is determined that there is no degradation of the fuel cell module.

In the present invention thus constituted, the controller controls the fuel supply device and the oxidant gas supply device to supply fuel and oxidant gas to the fuel cell module. The degradation determining circuit provided on the controller determines degradation in fuel cell module, and the degradation response circuit changes fuel cell module operating conditions based on the degradation determination. The degradation determining circuit stores the operating results of the fuel cell module resulting from the operating conditions changed by the degradation response circuit, and performs a further degradation determination based on the stored operation results.

In the present invention thus constituted, the results of operating the fuel cell module under operating conditions changed by the degradation response circuit are stored, and a further degradation determination is executed based on the stored operating results, therefore the degradation determining circuit can determine degradations over multiple iterations. In other words, because the next degradation determination can be carried out in a state which reflects the absorption of degradation status, the accumulation of degradation determination inaccuracies and false determinations can be reliably prevented. This enables appropriate change of operating conditions to fit the degradation state, thereby maintaining performance over a long time period.

In the present invention, there is preferably also a temperature detection sensor for detecting the temperature of fuel cell units, and the degradation determining circuit determines fuel cell module degradation based on the temperature of solid oxide fuel cell units when operated in predetermined degradation determining operating conditions.

In the present invention thus constituted, the degradation determining circuit determines fuel cell module degradation based on the temperature of fuel cell units when operated in predetermined degradation determining operating conditions, therefore false determinations of degradation can be prevented.

The present invention is preferably also furnished with a power detecting sensor for detecting fuel cell module output power, and the degradation determining circuit determines fuel cell module degradation based on fuel cell module output power when operated in predetermined degradation determining operating conditions.

In the present invention thus constituted, the degradation determining circuit determines fuel cell module degradation based on fuel cell module output power when operated in predetermined degradation determining operating conditions, therefore the accuracy of degradation determinations can be improved.

In the present invention the degradation determining circuit preferably stores solid oxide fuel cell temperatures as predetermined measurement values obtained from operating results and executes further fuel cell module degradation determinations based on these temperatures.

In the present invention thus constituted, the degradation determining circuit stores solid oxide fuel cell temperatures as operating results and executes further fuel cell module degradation determinations based on these temperatures, therefore the degree of progress in fuel cell module degradation can be appropriately grasped.

In the present invention the degradation determining circuit preferably stores as a reference temperature at the time of initial fuel cell module operation the temperature of fuel cell units corresponding to predetermined operating conditions and, based on this reference temperature, executes a first fuel cell module degradation determination.

In the present invention thus constituted, the first fuel cell module degradation determination is executed based on an initial fuel cell reference temperature, therefore an accurate degradation determination can be made even when there are individual differences between fuel cell module furnished with fuel cell units.

In the present invention the degradation response circuit preferably changes fuel cell module operating conditions when the degradation determining circuit has determined fuel cell module degradation over multiple continuous iterations or during a predetermined continuous time period.

In the present invention thus constituted, operating conditions are changed when there are determinations of degradation continuously over multiple continuous iterations, or over a predetermined continuous time period, therefore accurate degradation determinations can in general be performed even if there are temporary malfunctions or the like.

In the present invention the degradation determining circuit preferably executes a degradation determination of the next fuel cell module when a predetermined degradation determining time has elapsed after operating conditions are changed by the degradation determining circuit.

In the present invention thus constituted, the degradation determination is executed after a predetermined degradation determining time has elapsed, therefore the degradation determination can be executed in a stable fuel cell module operating state, and an accurate degradation determination can be performed.

In the present invention when the operating conditions are changed by the degradation response circuit, the degradation determining circuit preferably stores fuel cell module output power relative to changed operating conditions as a predetermined measurement value obtained from operating results, and further determines fuel cell module degradation based on this output power.

In the present invention thus constituted, when the operating conditions are changed by the degradation determining circuit, the post-change operating condition output power is stored and a further degradation determination is executed, therefore multiple degradation determinations can be carried out and false determinations prevented.

In the present invention, when temperature of the fuel cell units have reached a predetermined maximum temperature the controller preferably performs subsequent controls by treating electrical power output at the maximum temperature as the rated output power, which is the maximum electrical power output from the fuel cell module.

In the present invention thus constituted, subsequent control is carried out by treating the electrical power output at maximum temperature as the rated output power, therefore operation exceeding the maximum temperature can be avoided, and promotion of fuel cell unit degradation prevented.

In the present invention the degradation determining circuit preferably executes a fuel cell module degradation determination when both at least one condition selected from among outside air temperature, outside air humidity, and time of day, together with the amount of fuel supplied by the fuel supply device, satisfy predetermined conditions.

In the present invention degradation is determined when a condition selected from among outside air temperature, outside air humidity, and time of day, along with the amount of fuel supplied, satisfy predetermined conditions, therefore negative influence on the degradation determination from environmental factors can be avoided.

In the present invention the controller preferably reduces the maximum rate of change in the amount of fuel supplied by the fuel supply device per unit time after a fuel cell module is determined to have degraded by the degradation determining circuit.

In the present invention thus constituted, the maximum rate of change per unit time in fuel supply amount is reduced after a degradation determination is made, therefore burdening of fuel cells caused by sudden changes in fuel supply amounts can be prevented.

The present invention is a solid oxide fuel cell, having fuel cell module furnished with multiple fuel cell units; a fuel supply means for supplying fuel to these fuel cell module; an oxidant gas supply means for supplying oxidant gas to the fuel cell module; and a control means for controlling the fuel cell module operation by controlling the amount of fuel supplied from the fuel supply means; the control means is furnished with a degradation determining means for determining degradation in fuel cell module from predetermined measurement values obtained from the results of fuel cell module operation, and with a degradation response means for changing fuel cell module operating conditions to respond to degradation when it is determined using the degradation determining means that there has been a degradation of a fuel cell module; furthermore, when the degradation determining means determines there has been a fuel cell module degradation, the control means operates the fuel cell module under operating conditions changed by the degradation response means and thereafter obtains and stores specified measurement values obtained from the operating results of the fuel cell module under the changed operating conditions, and by comparing the stored measurement values with subsequently newly acquired specified measurement values, determines the additional amount of progress in the degradation of the fuel cell module occurring after the operating conditions changed, while on the other hand does not update the stored measurement value if it is determined that there is no degradation of the fuel cell module.

Effect of the Invention

Using the solid oxide fuel cell of the present invention, performance can be maintained over a long time period by appropriately changing fuel cell module operating conditions.

BRIEF DESCRIPTION OF FIGURES

FIG. 12: A flow chart showing the degradation determination procedure.

EMBODIMENTS OF THE INVENTION

Next, referring to the attached drawings, we discuss a solid oxide fuel cell (SOFC) according to an embodiment of the present invention.

Figure 1:
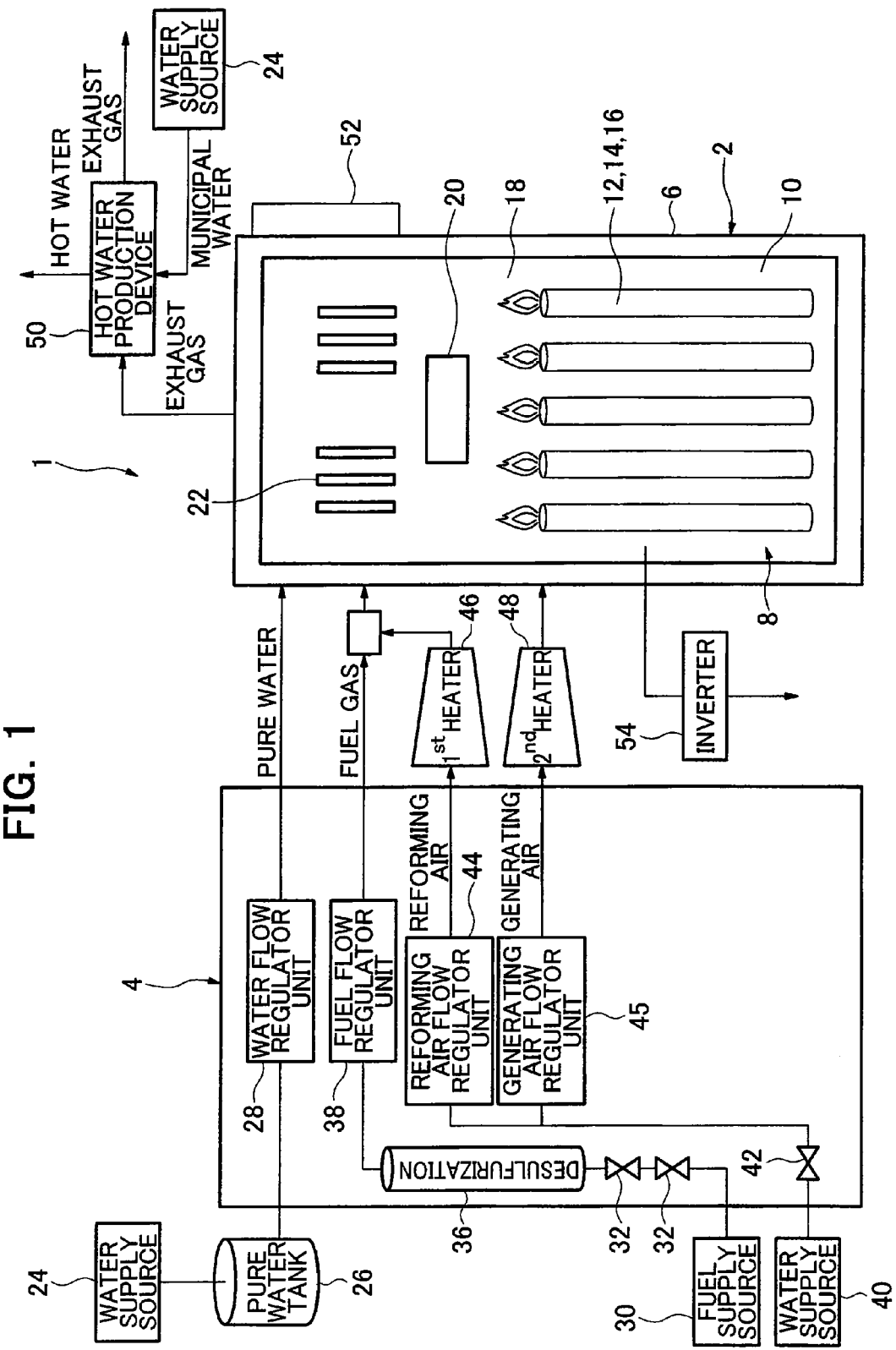
FIG. 1: An overall schematic showing a solid oxide fuel cell (SOFC) according to an embodiment of the present invention.

FIG. 1 is an overview diagram showing a solid oxide fuel cell (SOFC) according to an embodiment of the present invention.

As shown in FIG. 1, the solid oxide fuel cell (SOFC) of this embodiment of the present invention is furnished with a fuel cell module 2 and an auxiliary unit 4.

The fuel cell module 2 is furnished with a housing 6; a sealed space 8 is formed within the housing 6, mediated by insulating material (not shown; the insulating material is not an indispensable structure and may be omitted). Note that it is acceptable not to provide insulating material. A fuel cell assembly 12 for carrying out the electrical generating reaction between fuel gas and oxidant (air) is disposed in the generating chamber 10 at the lower portion of this sealed space 8. This fuel cell assembly 12 is furnished with ten fuel cell stacks 14 (see FIG. 5), and a fuel cell stack 14 comprises 16 fuel cell units 16 (see FIG. 4). Thus, the fuel cell assembly 12 has 160 fuel cell units 16, all of which are serially connected.

A combustion chamber 18 is formed above the aforementioned generating chamber 10 in the fuel cell module 2 sealed space 8; residual fuel gas and residual oxidizer (air) not used in the electrical generation reaction are burned in this combustion chamber 18 and produce exhaust gas.

A reformer 20 for reforming fuel gas is disposed at the top of the combustion chamber 18; the reformer 20 is heated by the heat of residual gas combustion to a temperature at which the reforming reaction can take place. An air heat exchanger 22 for receiving combustion heat and heating the air is further disposed above this reformer 20.

Next, the auxiliary unit 4 is furnished with a pure water tank 26 for holding water from a municipal or other water supply source 24 and filtering it into pure water, and a water flow rate regulator unit 28 (a "water pump" or the like driven by a motor) for regulating the flow rate of water supplied from the reservoir tank. The auxiliary tank 4 is further furnished with a gas shutoff valve 32 for shutting off the fuel gas supply from a fuel supply source 30 such as municipal gas or the like, and a fuel flow rate regulator unit 38 (a "fuel pump" or the like driven by a motor) for regulating the flow rate of fuel gas. Furthermore, an auxiliary unit 4 is furnished with an electromagnetic valve 42 for shutting off air serving as an oxidizer supplied from an air supply source 40, a reforming air flow rate regulator unit 44 and generating air flow rate regulator unit 45 ("air blower" or the like driven by a motor) for regulating air flow rate, a first heater 46 for heating reforming air supplied to the reformer 20, and a second heater 48 for heating generating air supplied to the generating chamber. This first heater 46 and second heater 48 are provided in order to efficiently raise the temperature at startup, and may be omitted.

Next, a hot-water producing device 50 supplied with exhaust gas is connected to the fuel cell module 2. Municipal water from a water supply source 24 is supplied to this hot-water producing device 50; this water is turned into hot water by the heat of the exhaust gas, and is supplied to a hot water reservoir tank in an external water heater, not shown.

A control box 52 for controlling the amount of fuel gas supplied, etc. is connected to the fuel cell module 2.

Furthermore, an inverter 54 serving as an electrical power extraction unit (electrical power conversion unit) for supplying electrical power generated by the fuel cell module to the outside is connected to the fuel cell module 2.

Figure 2:
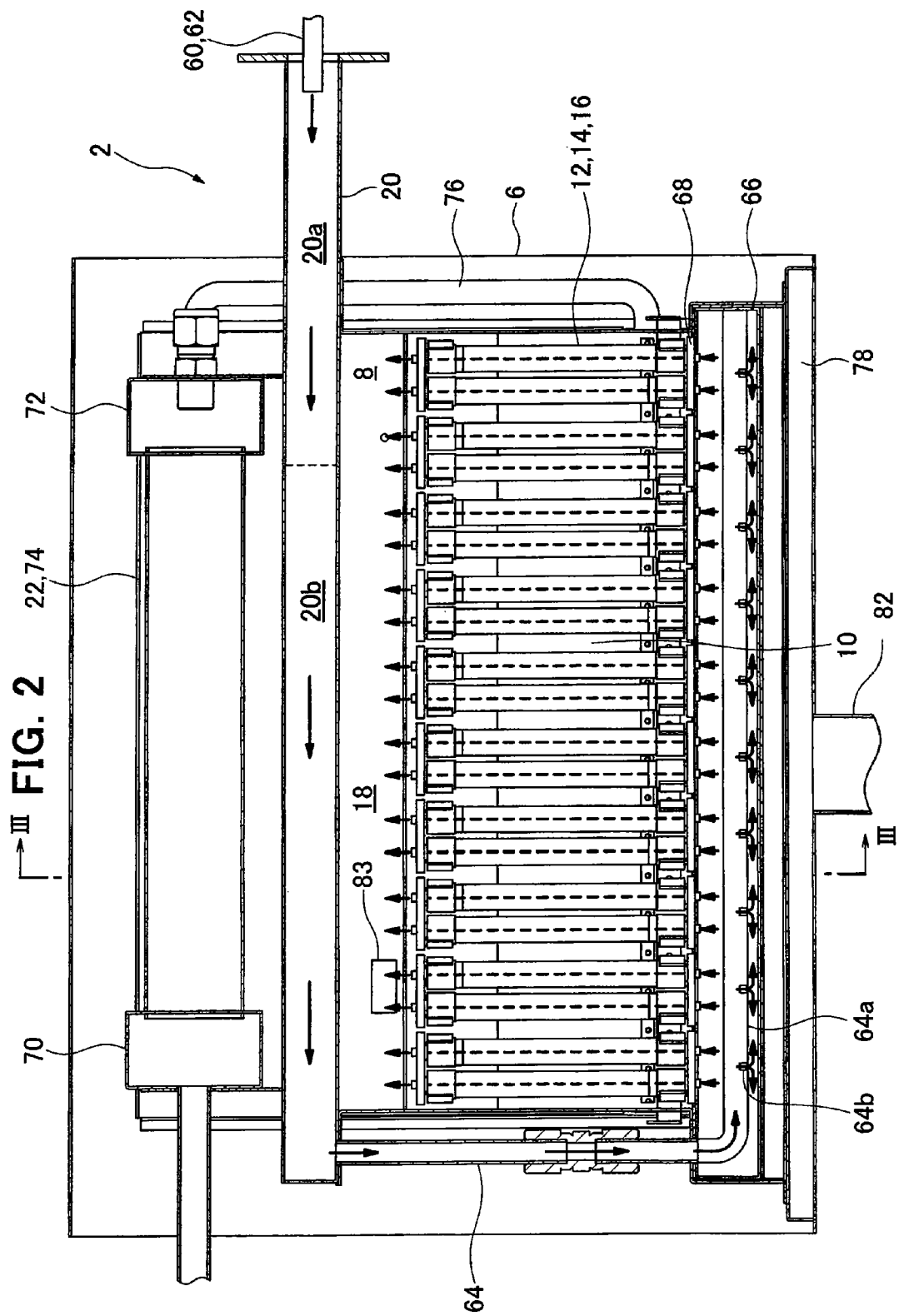
FIG. 2: A front elevation sectional diagram showing a solid oxide fuel cell (SOFC) fuel cell module according to an embodiment of the present invention.
Figure 3:
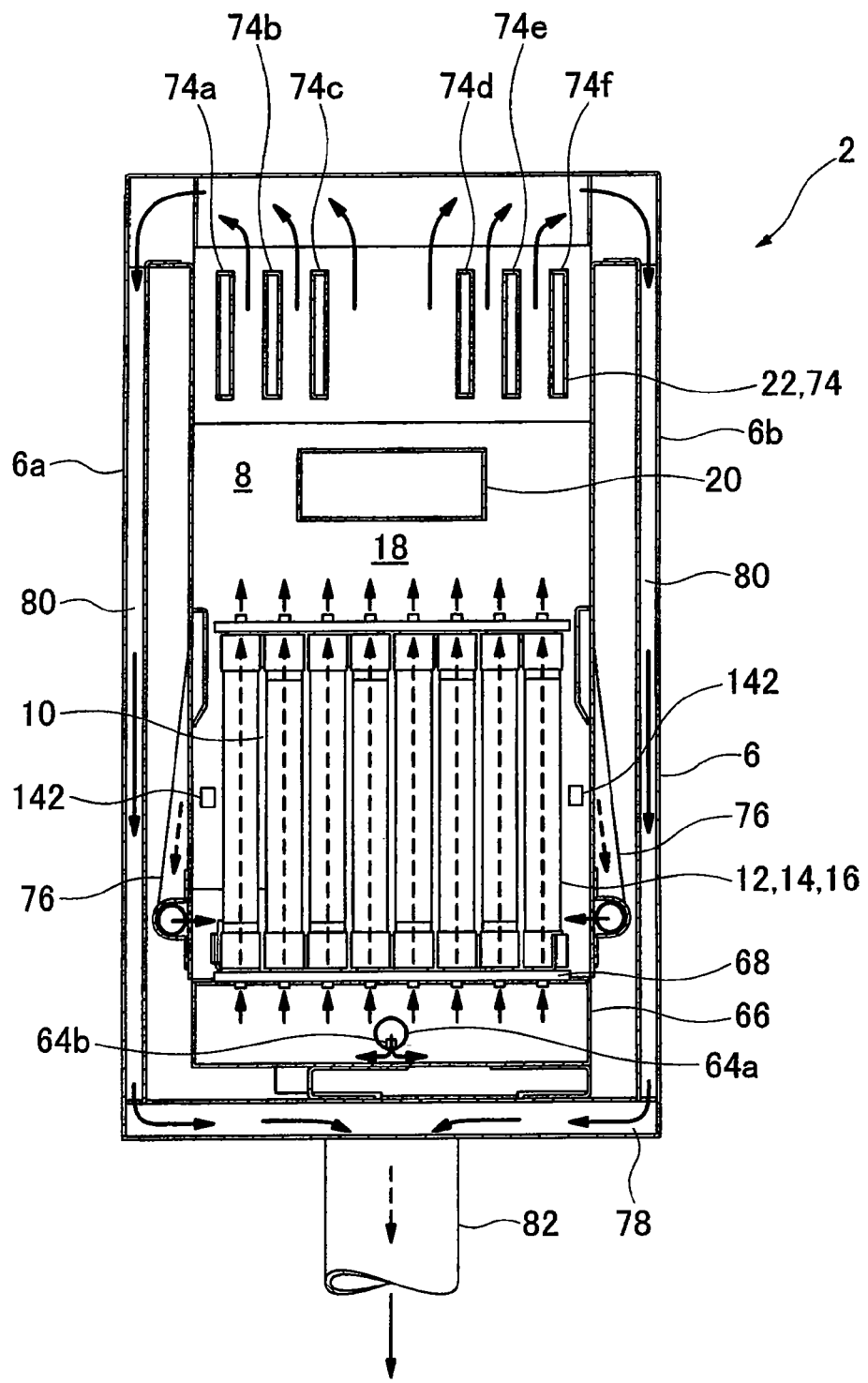
FIG. 3: A sectional diagram along line in FIG. 2.

The internal structure of the solid oxide fuel cell (SOFC) fuel cell module of this embodiment of the present invention is explained using FIGS. 2 and 3. FIG. 2 is a side elevation sectional diagram showing a fuel cell module in a solid oxide fuel cell (SOFC) according to an embodiment of the present invention;

FIG. 3 is a sectional diagram along line III-III of FIG. 2.

As shown in FIGS. 2 and 3, starting from the bottom in the sealed space 8 within the fuel cell module 2 housing 6, a fuel cell assembly 12, a reformer 20, and an air heat exchanger 22 are arranged in sequence, as described above.

A pure water guide pipe 60 for introducing pure water on the upstream end of the reformer 20, and a reform gas guide pipe 62 for introducing the fuel gas and reforming air to be reformed, are attached to the reformer 20; a vaporizing section 20a and a reforming section 20b are formed in sequence starting from the upstream side within the reformer 20, and the reforming section 20b is filled with a reforming catalyst. Fuel gas and air blended with the steam (pure water) introduced into the reformer 20 is reformed by the reforming catalyst used to fill in the reformer 20. Appropriate reforming catalysts are used, such as those in which nickel is imparted to the surface of aluminum spheres, or ruthenium is imparted to aluminum spheres.

A fuel gas supply line 64 is connected to the downstream end of the reformer 20; this fuel gas supply line 64 extends downward, then further extends horizontally within a manifold 66 formed under the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

A lower support plate 68 provided with through holes for supporting the above-described fuel cell stack 14 is attached at the top of the manifold 66, and fuel gas in the manifold 66 is supplied into the fuel cell unit 16.

Next, an air heat exchanger 22 is provided over the reformer 20. This air heat exchanger 22 is furnished with an air concentration chamber 70 on the upstream side and two air distribution chambers 72 on the downstream side; these air concentration chamber 70 and the distribution chambers 72 are connected using six air flow conduits 74. Here, as shown in FIG. 3, three air flow conduits 74 form a set (74a, 74b, 74c, 74d, 74e, 74f; air in the air concentration chamber 70 flows from each set of the air flow conduits 74 to the respective air distribution chambers 72.

Air flowing in the six air flow conduits 74 of the air heat exchanger 22 is pre-heated by rising combustion exhaust gas from the combustion chamber 18.

Air guide pipes 76 are connected to each of the respective air distribution chambers 72; these air guide pipes 76 extend downward, communicating at the bottom end side with the lower space in the generating chamber 10, and introducing preheated air into the generating chamber 10.

Next, an exhaust gas chamber 78 is formed below the manifold 66. As shown in FIG. 3, an exhaust gas conduit 80 extending in the vertical direction is formed on the insides of the front surface 6a and the rear surface 6b which form the faces in the longitudinal direction of the housing 6; the top end side of the exhaust gas conduit 80 communicates with the space in which the air heat exchanger 22 is disposed, and the bottom end side communicates with the exhaust gas chamber 78. An exhaust gas discharge pipe 82 is connected at approximately the center of the bottom surface of the exhaust gas chamber 78; the downstream end of this exhaust gas discharge pipe 82 is connected to the above-described hot water producing device 50 shown in FIG. 1.

As shown in FIG. 2, an ignition device 83 for starting the combustion of fuel gas and air is disposed on the combustion chamber 18.

Figure 4:
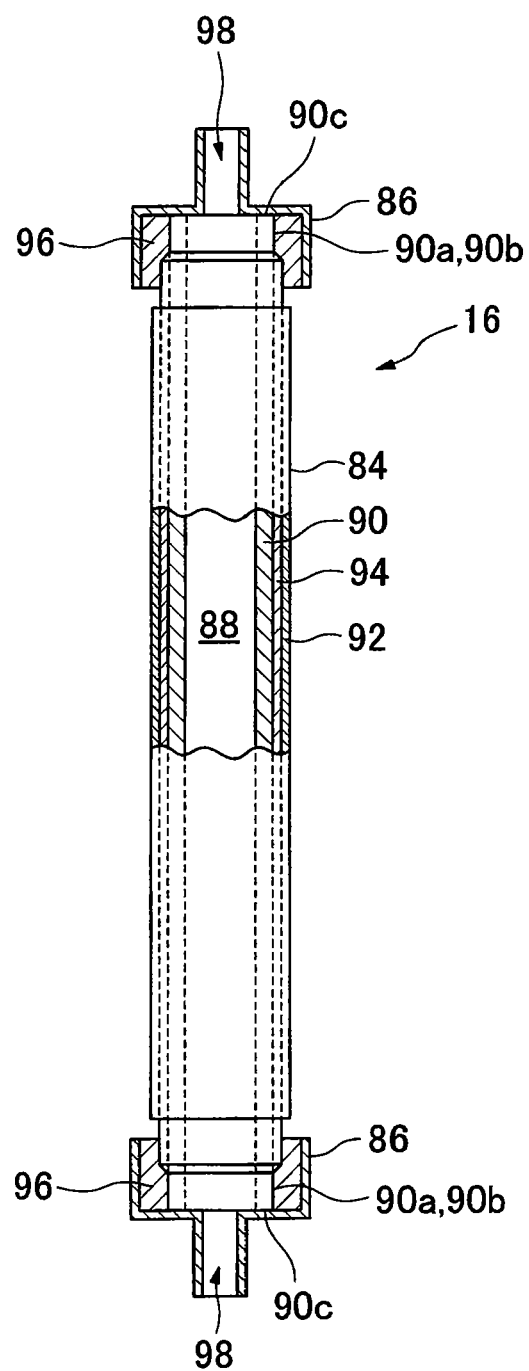
FIG. 4: A partial section showing a solid oxide fuel cell (SOFC) fuel cell unit according to an embodiment of the present invention.

Next we discuss the fuel cell unit 16, referring to FIG. 4. FIG. 4 is a partial section showing a solid oxide fuel cell (SOFC) fuel cell unit according to an embodiment of the present invention.

As shown in FIG. 4, the fuel cell unit 16 is furnished with a fuel cell 84 and internal electrode terminals 86, respectively connected to the respective terminals at the top and bottom of the fuel cell 84.

The fuel cell 84 is a tubular structure extending in the vertical direction, furnished with a cylindrical internal electrode layer 90, on the inside of which is formed a fuel gas flow path 88, a cylindrical external electrode layer 92, and an electrolyte layer 94 between the internal electrode layer 90 and the external electrode layer 92. This internal electrode layer 90 is a fuel electrode through which fuel gas passes, and is a (−) pole, while the external electrode layer 92 is an air electrode which contacts the air, and is a (+) pole.

The internal electrode terminals 86 attached at the top end and bottom ends of the fuel cell device 16 have the same structure, therefore we will here discuss specifically the internal electrode terminal 86 attached at the top end side. The top portion 90a of the inside electrode layer 90 is furnished with an outside perimeter surface 90b and top end surface 90c, exposed to the electrolyte layer 94 and the outside electrode layer 92. The inside electrode terminal 86 is connected to the outer perimeter surface 90b of the inside electrode layer 90 through a conductive seal material 96, and is electrically connected to the inside electrode layer 90 by making direct contact with the top end surface 90c of the inside electrode layer 90. A fuel gas flow path 98 communicating with the inside electrode layer 90 fuel gas flow path 88 is formed at the center portion of the inside electrode terminal 86.

The inside electrode layer 90 is formed, for example, from at least one of a mixture of Ni and zirconia doped with at least one type of rare earth element selected from Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; silver, or the like.

Figure 5:
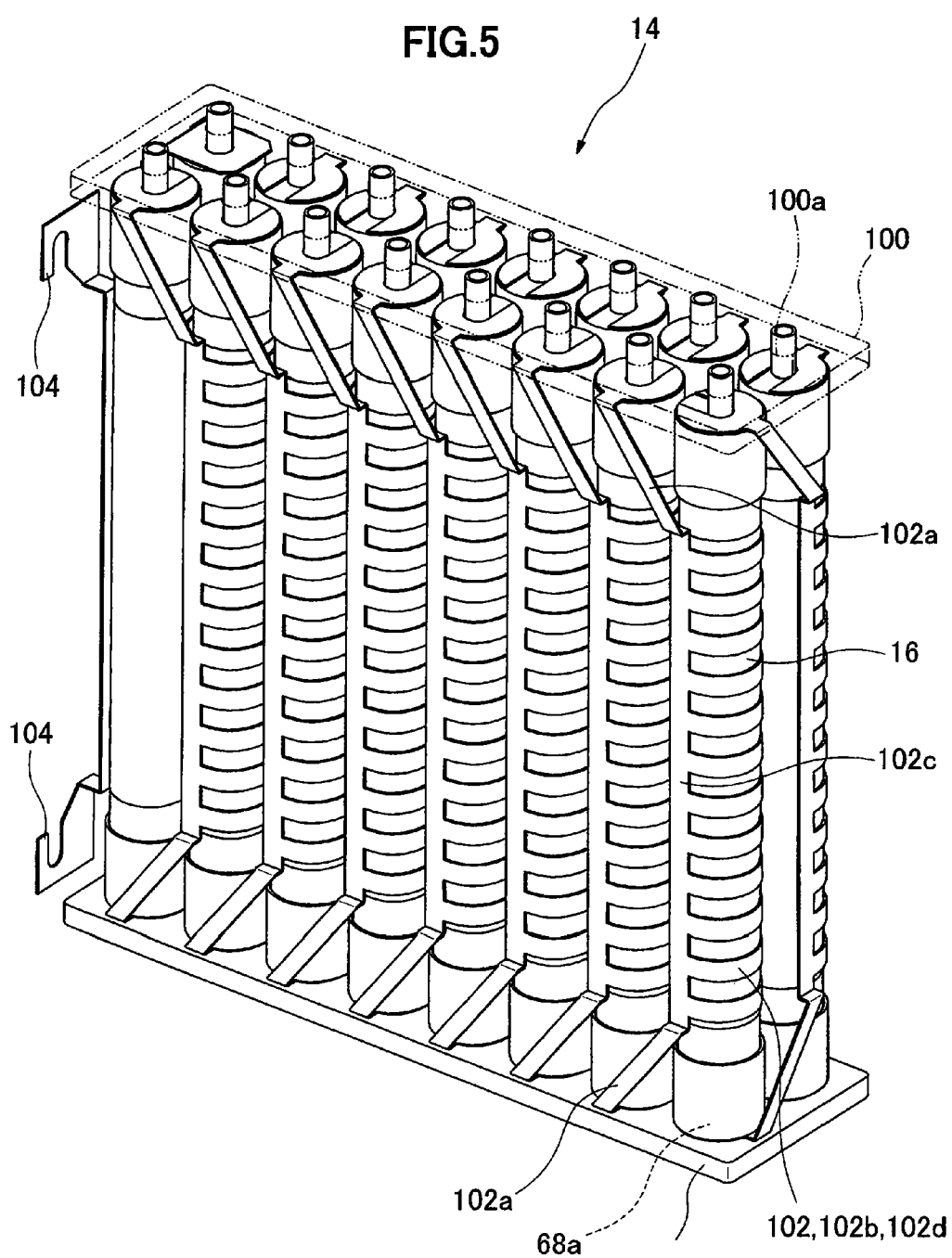
FIG. 5: A perspective diagram showing a solid oxide fuel cell (SOFC) fuel cell stack according to an embodiment of the present invention.

Next we discuss the fuel cell stack 14, referring to FIG. 5. FIG. 5 is a perspective view showing the fuel cell stack in a solid oxide fuel cell (SOFC) according to an embodiment of the present invention.

As shown in FIG. 5, the fuel cell stack 14 is furnished with sixteen fuel cell units 16; the top end side and bottom end side of these fuel cell units 16 are respectively supported by a lower support plate 68 and upper support plate 100. Through holes 68a and 100a, through which the inside electrode terminal 86 can penetrate, are provided on this lower support plate 68 and outer support plate 100.

In addition, a current collector 102 and an external terminal 104 are attached to the fuel cell unit 16. This current collector 102 is integrally formed by a fuel electrode connecting portion 102a, which is electrically connected to the inside electrode terminal 86 attached to the inside electrode layer 90 serving as the fuel electrode, and by an air electrode connecting portion 102*b*, which is electrically connected to the entire external perimeter surface of the outside electrode layer 92 serving as the air electrode. The air electrode connecting portion 102*b* is formed of a vertical portion 102*c* extending vertically along the surface of the outside electrode layer 92, and multiple horizontal portions 102*d* extending in the horizontal direction from this vertical portion 102*c* along the surface of the outside electrode layer 92. The fuel electrode connecting portion 102*a* extends linearly in an upward or downward diagonal direction from the vertical portion 102*c* of the air electrode connecting portion 102*b* toward the inside electrode terminals 86 positioned in the upper and lower directions on the fuel cell unit 16.

Furthermore, electrode terminals 86 at the top and bottom ends of the two fuel cell units 16 positioned at the end of the fuel cell stack 14 (at the front and back sides on the left edge in FIG. 5) are respectively connected to the outside terminals 104. These external terminals 104 are connected to the external terminals 104 (not shown) at the ends of the adjacent fuel cell stack 14, and as described above, all of the 160 fuel cell units 16 are connected in series.

Figure 6:
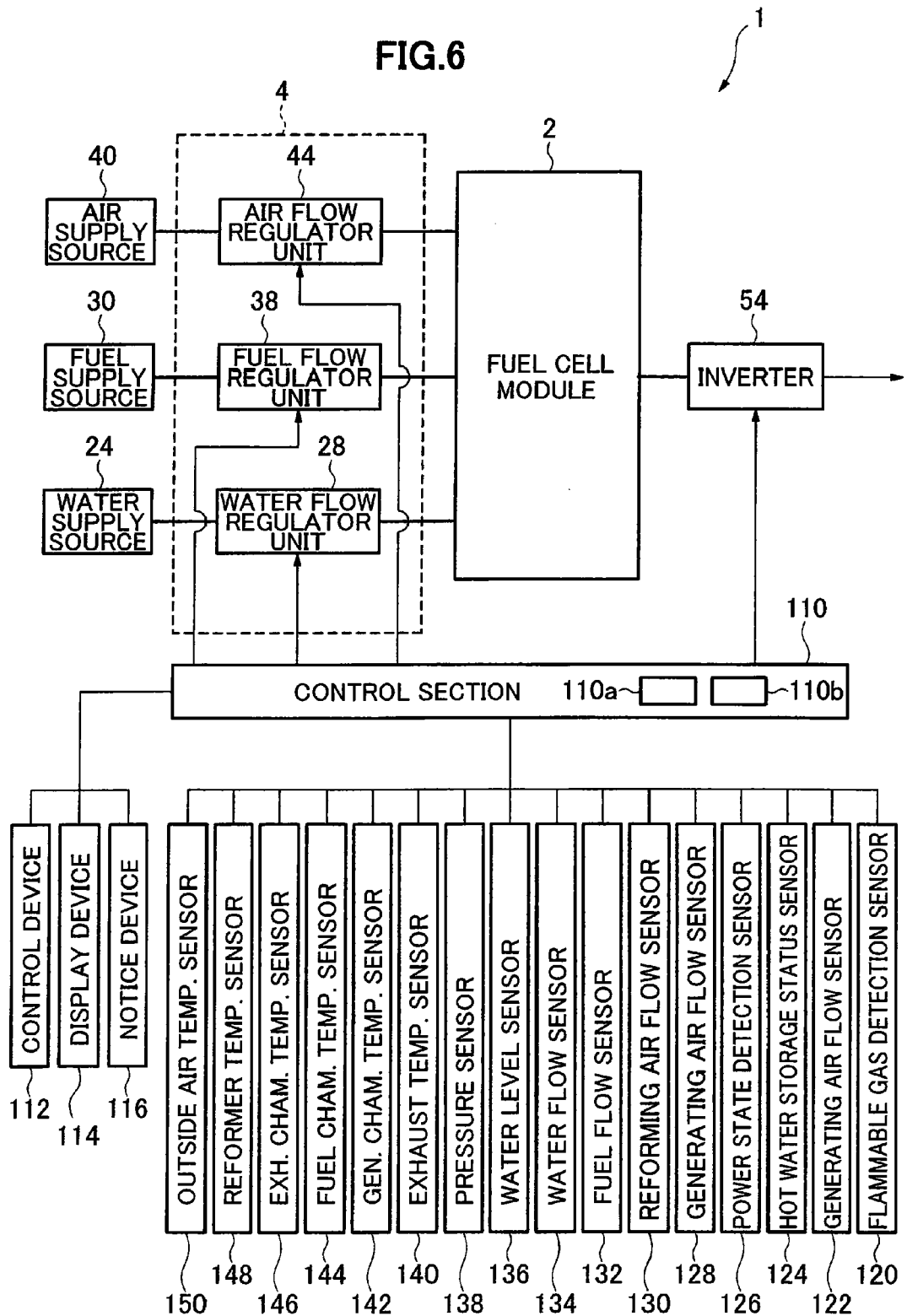
FIG. 6: A block diagram showing a solid oxide fuel cell (SOFC) according to an embodiment of the present invention.

Next, referring to FIG. 6, we discuss the sensors attached to the solid oxide fuel cell (SOFC) according to the present embodiment. FIG. 6 is a block diagram showing a solid oxide fuel cell (SOFC) according to an embodiment of the present invention.

As shown in FIG. 6, a solid oxide fuel cell device 1 is furnished with a control unit 110; an operating device 112 provided with operating buttons such as "ON" or "OFF" for user operation, a display device 114 for displaying various data such as a generator output value (Watts), and a notification device 116 for issuing warnings during abnormal states and the like are connected to this control unit 110. This notification device 116 may be connected to a remote control center to inform the control center of abnormal states.

Next, signals from the various sensors described below are input to the control unit 110.

First, a flammable gas detection sensor 120 detects gas leaks and is attached to the fuel cell module 2 and the auxiliary unit 4.

The purpose of the CO gas detection sensor 120 is to detect leakage of CO in the exhaust gas, which is meant to be exhausted to the outside via the exhaust gas conduit 80, into the external housing (not shown) which covers the fuel cell module 2 and the auxiliary unit 4.

A water reservoir state detection sensor 124 detects the temperature and amount of hot water in a water heater (not shown).

An electrical power state detection sensor 126 detects current, voltage, and the like in the inverter 54 and in a distribution panel (not shown).

A generator air flow rate detection sensor 128 detects the flow rate of generator air supplied to the generating chamber 10.

A reforming air flow rate sensor 130 detects the flow rate of reforming air flow supplied to the reformer 20.

A fuel flow rate sensor 132 detects the flow rate of fuel gas supplied to the reformer 20.

A water flow rate sensor 134 detects the flow rate of pure water (steam) supplied to the reformer 20.

A water level sensor 136 detects the water level in pure water tank 26.

A pressure sensor 138 detects pressure on the upstream side outside the reformer 20

An exhaust temperature sensor 140 detects the temperature of exhaust gas flowing into the hot water producing device 50.

As shown in FIG. 3, a generating chamber temperature sensor 142 is disposed on the front surface side and rear surface side around the fuel cell assembly 12, and detects the temperature around the fuel cell stack 14 in order to estimate the temperature of the fuel cell stack 14 (i.e., of the fuel cell 84 itself).

A combustion chamber temperature sensor 144 detects the temperature in combustion chamber 18.

An exhaust gas chamber temperature sensor 146 detects the temperature of exhaust gases in the exhaust gas chamber 78.

A reformer temperature sensor 148 detects the temperature of the reformer 20 and calculates the reformer 20 temperature from the intake and exit temperatures on the reformer 20.

If the solid oxide fuel cell (SOFC) is placed outdoors, the outside temperature sensor 150 detects the temperature of the outside atmosphere. Sensors to detect outside atmospheric humidity and the like may also be provided.

Signals from these various sensor types are sent to the control unit 110; the control unit 110 sends control signals to the water flow rate regulator unit 28, the fuel flow rate regulator unit 38, the reforming air flow rate regulator unit 44, and the generating air flow rate regulator unit 45 based on data from the sensors, and controls the flow rates in each of these units.

The control unit 110 sends control signals to the inverter 54 to control the amount of electrical power supply.

Figure 7:
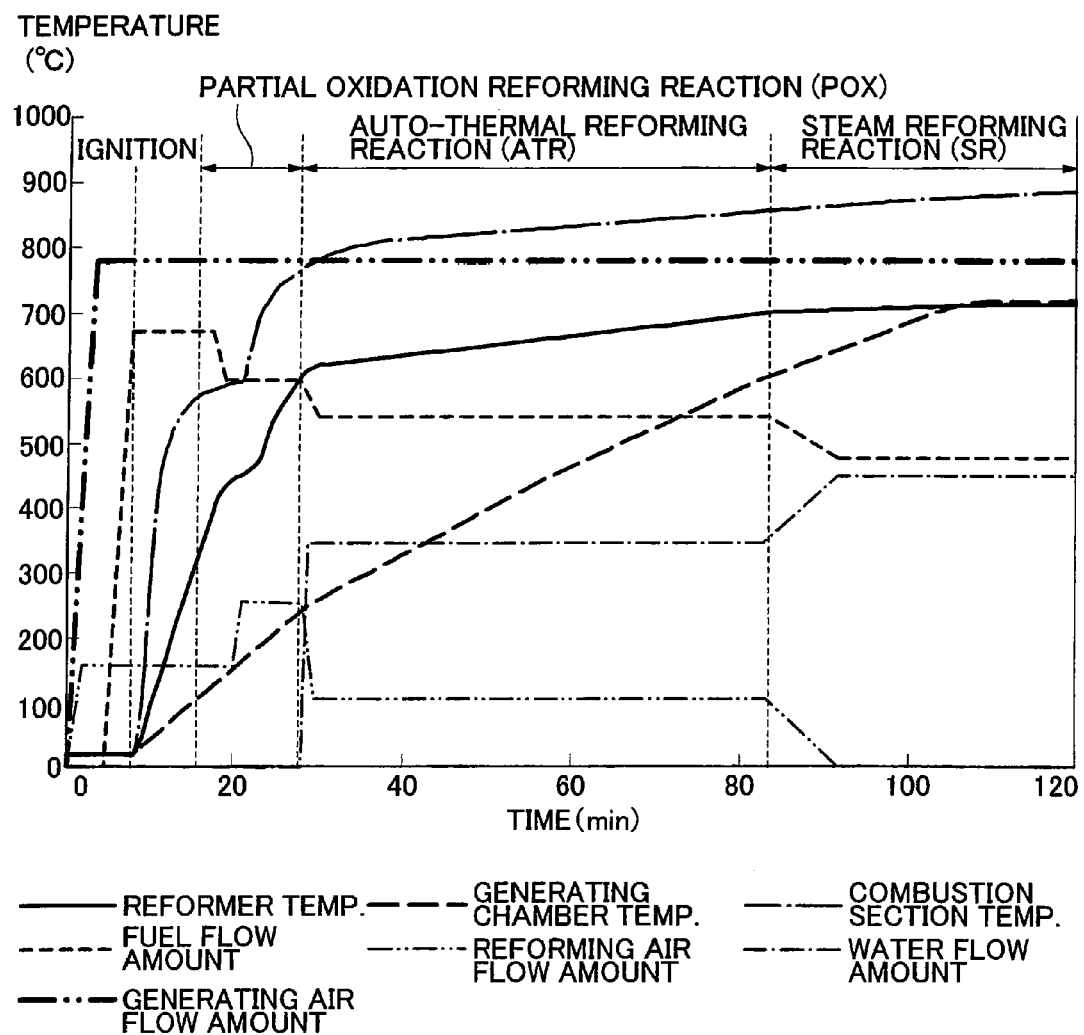
FIG. 7: A timing chart showing the operation at the time of startup of a solid oxide fuel cell (SOFC) according to an embodiment of the present invention.

Next, referring to FIG. 7, we discuss the operation of a solid oxide fuel cell (SOFC) according to the present embodiment at the time of start-up.

FIG. 7 is a timing chart showing the operations of a solid oxide fuel cell (SOFC) according to an embodiment of the present invention at the time of start-up.

At the beginning, in order to warm up the fuel cell module 2, operation starts in a no-load state, i.e., with the circuit which includes the fuel cell module 2 in an open state. At this point current does not flow in the circuit, therefore the fuel cell module 2 does not generate electricity.

First, reforming air is supplied from the reforming air flow rate regulator unit 44 through a first heater 46 to the reformer 20 on the fuel cell module 2. At the same time, generating air is supplied from the generating air flow rate regulator unit 45 through a second heater 48 to the air heat exchanger 22 of the fuel cell module 2, and this generating air reaches the generating chamber 10 and the combustion chamber 18.

Immediately thereafter, fuel gas is also supplied from the fuel flow rate regulator unit 38, and fuel gas into which reform air is blended passes through the reformer 20, the fuel cell stack 14, and the fuel cell unit 16 to reach the combustion chamber 18.

Next, ignition is brought about by the ignition device 83, and fuel gas and air (reforming air and generating air) supplied to the combustion chamber 18 is combusted. This combustion of fuel gas and air produces exhaust gas; the generating chamber 10 is warmed by this exhaust gas, and when the exhaust gas rises in the fuel cell module 2 sealed space 8, the fuel gas, which includes reforming air in the reformer 20 is warmed, as is the generating air inside the air heat exchanger 22.

At this point, fuel gas into which reform air is blended is supplied to the reformer 20 by the fuel flow rate regulator unit 38 and the reforming air flow rate regulator unit 44, therefore the partial oxidation reforming reaction PDX given by Expression (1) proceeds. This partial oxidation reforming reaction PDX is an exothermic reaction, and therefore has favorable starting characteristics. The fuel gas whose temperature has risen is supplied from the fuel gas supply line 64 to the bottom of the fuel cell stack 14, and by this means the fuel cell stack 14 is heated from the bottom, and the combustion chamber 18 is also heated by the combustion of the fuel gas and air, so that the fuel stack 14 is also heated from above, enabling as a result an essentially uniform rise in temperature in the vertical direction of the fuel cell stack 14. Even though the partial oxidation reforming reaction PDX is progressing, the ongoing combustion reaction between fuel gas and air is continued in the combustion chamber 18.

$$C_mH_n + xO_2 \rightarrow aCO_2 + bCO + cH_2 \qquad (1)$$

When the reformer temperature sensor 148 detects that the reformer 20 has reached a predetermined temperature (e.g. 600° C.) after the start of the partial oxidation reforming reaction PDX, a pre-blended gas of fuel gas, reforming air, and steam is applied to the reformer 20 by the water flow rate regulator unit 28, the fuel flow rate regulator unit 38, and the reforming air flow rate regulator unit 44. At this point an auto-thermal reforming reaction ATR, which makes use of both the aforementioned partial oxidation reforming reaction PDX and the steam reforming reaction SR described below, proceeds in the reformer 20. This auto-thermal reforming reaction ATR can be internally thermally balanced, therefore the reaction proceeds in a thermally independent fashion inside the reformer 20. In other words, when there is a large amount of oxygen (air), heat emission by the partial oxidation reforming reaction PDX dominates, and when there is a large amount of steam, the endothermic steam reforming reaction SR dominates. At this stage, the initial stage of startup has passed and some degree of elevated temperature has been achieved within the generating chamber 10, therefore even if the endothermic reaction is dominant, no major drop in temperature will be caused. Also, the combustion reaction continues within the combustion chamber 18 even as the auto-thermal reforming reaction ATR proceeds.

When the reformer temperature sensor 146 detects that the reformer 20 has reached a predetermined temperature (e.g., 700° C.) following the start of the auto-thermal reforming reaction ATR shown as Expression (2), the supply of reforming air by the reforming air flow rate regulator unit 44 is stopped, and the supply of steam by the water flow rate regulator unit 28 is increased. By this means, a gas containing no air and only containing fuel gas and steam is supplied to the reformer 20, where the steam reforming reaction SR of Expression (3) proceeds.

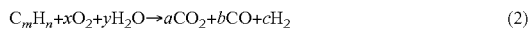

$$C_mH_n + xO_2 + yH_2O \rightarrow aCO_2 + bCO + cH_2 \qquad (2)$$

$$C_mH_n + xH_2O \rightarrow aCO_2 + bCO + cH_2 \qquad (3)$$

This steam reforming reaction SR is an endothermic reaction, therefore the reaction proceeds as a thermal balance is maintained with the combustion heat from the combustion chamber 18. At this stage, the fuel cell module is in the final stages of startup, therefore the temperature has risen to a sufficiently high level within the generating chamber 10 so that no major temperature dropped is induced in the generating chamber 10 even though an endothermic reaction is proceeding. Also, the combustion reaction continues to proceed in the combustion chamber 18 even as the steam reforming reaction SR is proceeding.

Thus, after the fuel cell module 2 has been ignited by the ignition device 83, the temperature inside the generating chamber 10 gradually rises as a result of the partial oxidation reforming reaction PDX, the auto-thermal reforming reaction ATR, and the steam reforming reaction SR which proceed in that sequence. Next, when the temperature inside the generating chamber 10 and the temperature of the fuel cell 84 reaches a predetermined generating temperature which is lower than the rated temperature at which the cell module 2 can be stably operated, the circuit which includes the fuel cell module 2 is closed, electrical generation by the fuel cell module 2 begins, and current then flows to the circuit. Generation of electricity by the fuel cell module 2 causes the fuel cell 84 itself to emit heat, such that the temperature of the fuel cell 84 rises. As a result, the rated temperature at which the fuel cell module 2 is operated becomes, for example, 600° C.-800° C.

Following this, an amount of fuel gas and air greater than that consumed by the fuel cell 84 is applied in order to maintain the rated temperature and continue combustion inside the combustion chamber 18. Generation of electricity by the high reform-efficiency steam reforming reaction SR proceeds while electricity is being generated.

Figure 8:
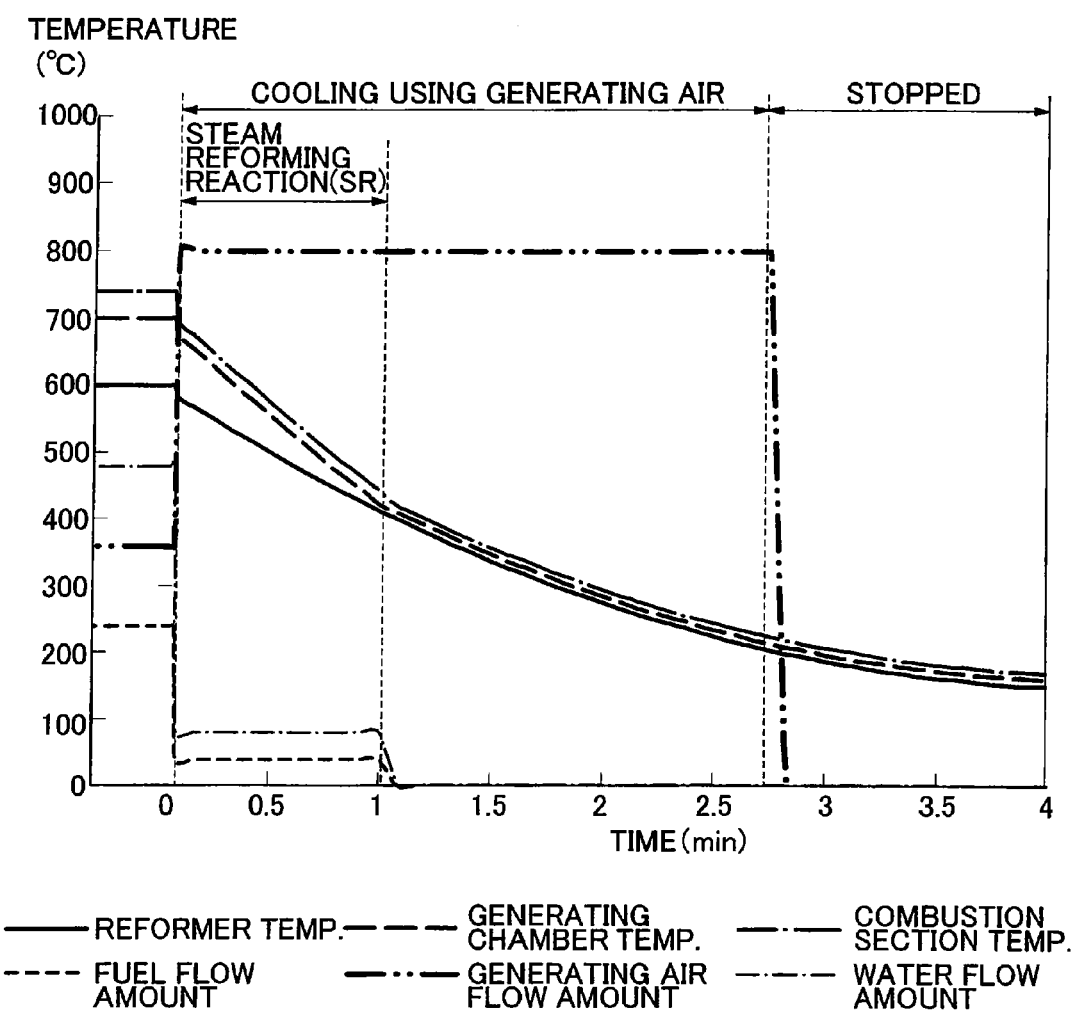
FIG. 8: A timing chart showing the operation at the time of shutdown of a solid oxide fuel cell (SOFC) according to an embodiment of the present invention.

Next, referring to FIG. 8, we discuss the operation upon stopping the solid oxide fuel cell (SOFC) of the present embodiment. FIG. 8 is a timing chart showing the operations which occur upon stopping the solid oxide fuel cell (SOFC) of the present embodiment.

As shown in FIG. 8, when stopping the operation of the fuel cell module 2, the fuel flow rate regulator unit 38 and the water flow rate regulator unit 28 are first operated to reduce the amount of fuel gas and steam being supplied to the reformer 20.

When stopping the operation of the fuel cell module 2, the amount of generating air supplied by the reforming air flow rate regulator unit 44 into the fuel cell module 2 is being increased at the same time that the amount of fuel gas and steam being supplied to the reformer 20 is being reduced; the fuel cell assembly 12 and the reformer 20 are air cooled to reduce their temperature. Thereafter, when the temperature of the generating chamber drops to, for example, 400° C., supply of the fuel gas and steam to the reformer 20 is stopped, and the steam reforming reaction SR in the reformer 20 ends. Supply of the generating air continues until the temperature in the reformer 20 reaches a predetermined temperature, e.g. 200° C.; when the predetermined temperature is reached, the supply of generating air from the generating air flow rate regulator unit 45 is stopped.

Thus in the present embodiment the steam reforming reaction SR by the reformer 20 and cooling by generating air are used in combination, therefore when the operation of the fuel cell module 2 is stopped, that operation can be stopped relatively quickly.

Next, referring to FIGS. 9 through 12, we discuss the operation of a solid oxide fuel cell according to an embodiment of the present invention.

Figure 9:
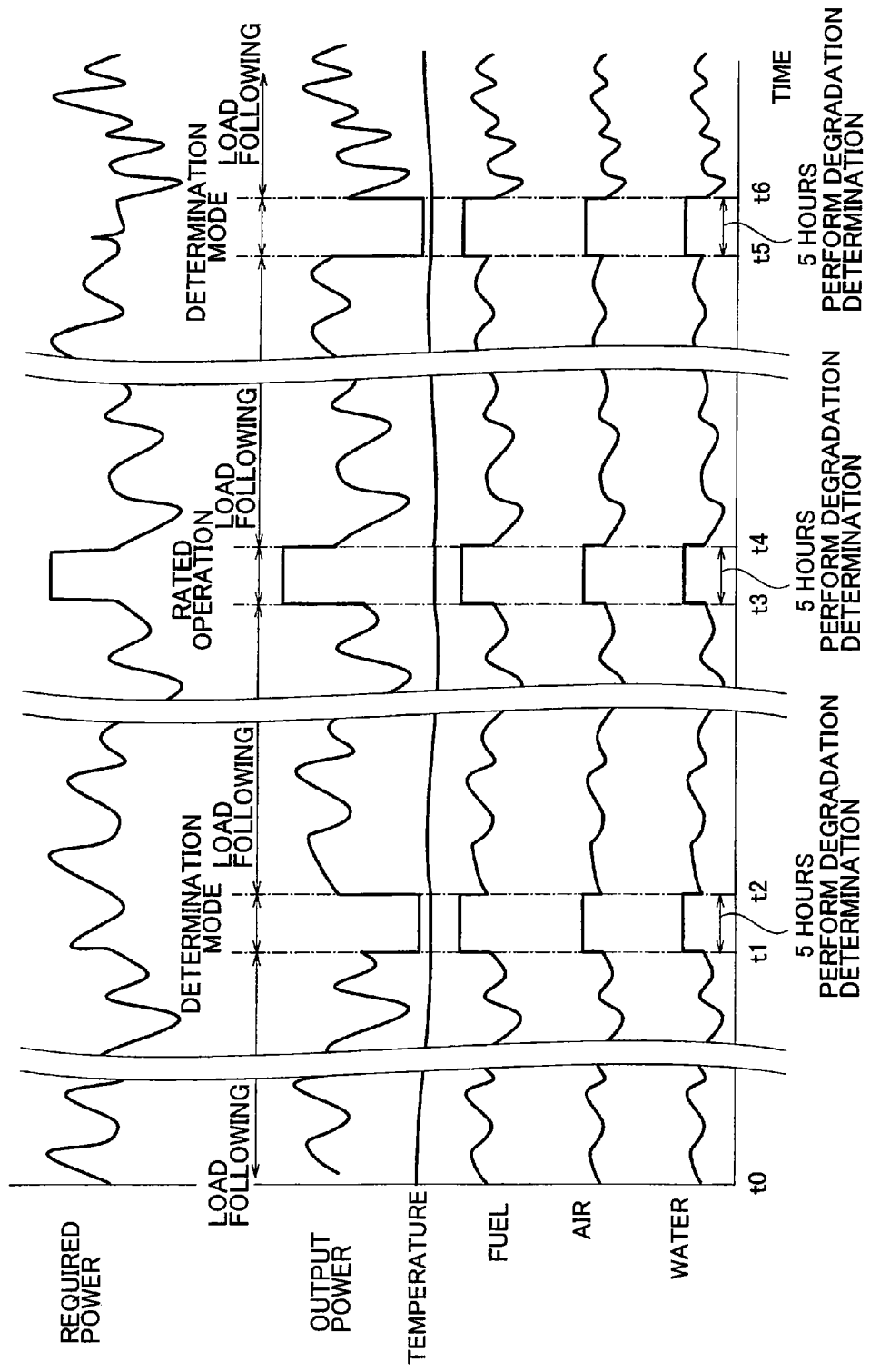
FIG. 9: A timing chart explaining the determination of degradation in a solid oxide fuel cell (SOFC) according to an embodiment of the present invention.
Figure 10:
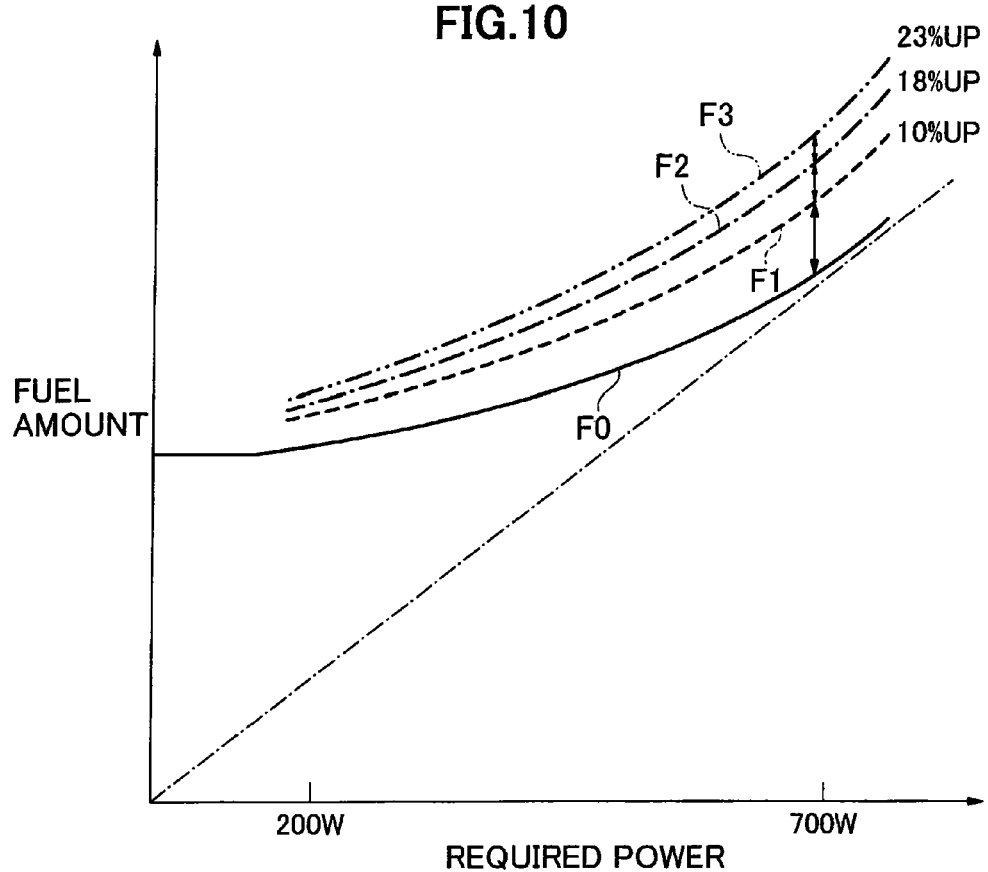
FIG. 10: A graph showing an example of the relationship between the required generation amount input to the control section and the fuel supply amount required to produce the required generation amount.
Figure 11:
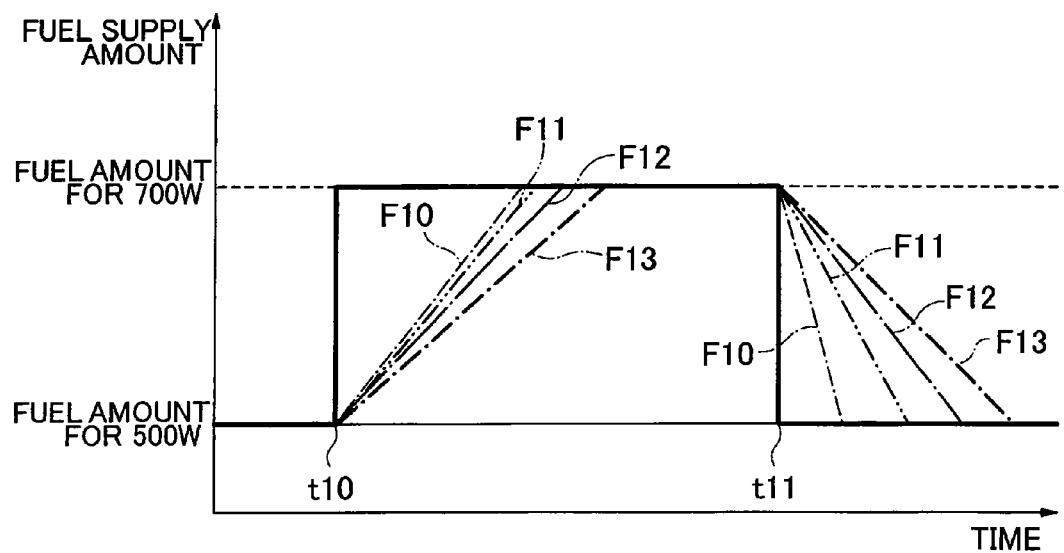
FIG. 11: A graph showing an example of the change over time in fuel supply amount relative to the change in required generation amount.

FIG. 9 is a timing chart explaining the determination of degradation in a solid oxide fuel cell (SOFC) according to an embodiment of the present invention. FIG. 10 is graph showing an example of the relationship between the required generation amount input to the control section 110 and the fuel supply amount required to produce the required generation amount. FIG. 11 is graph showing an example of the change over time in fuel supply amount relative to the change in required generation amount. FIG. 12 is a flow chart showing the degradation determination procedure.

At times t0-t1 in FIG. 9, the solid oxide fuel cell 1 is performing a load following operation so that an output power can be obtained in accordance with the amount of generation required by the inverter 54 (FIG. 6). As shown in FIG. 6, that is, the control section 110 serving as controller sends signals to the fuel flow rate regulator unit 38 serving as fuel supply device, the generating air flow rate regulator unit 45 serving as oxidant gas supply device, and the water flow rate regulator unit 28 serving as water supply device in accordance with the amount of generation required from the inverter 54, and supplies the required flow rates of fuel, air, and water to the fuel cell module 2. The output power of the solid oxide fuel cell 1 thus varies, as shown in FIG. 9, so as to follow the amount of generation required from the inverter 54. Here a delay is applied to the output power response relative to the amount of fuel supplied, etc.; the output power changes with a delay relative to changes in the fuel supply amount, etc., and there is almost no change in output power relative to sudden changes in the amount of generation required. Note that the fuel flow rate regulator unit 38, the generating air flow rate regulator unit 45, the water flow rate regulator unit 28, and the control section 110 function respectively as a fuel supply means, an oxidant gas supply means, a water supply means, and a control means.

The control section 110 determines the fuel supply amount using a graph, one example of which is shown in FIG. 10, in response to the amount of generation required from the inverter 54 and controls the fuel flow rate regulator unit 38 such that the determined amount (flow rate) of fuel is supplied to the fuel cell module 2. After the initial start of use of the solid oxide fuel cell 1 up until a determination is made that the fuel cell module 2 has degraded, the control section 110 determines a fuel supply amount relative to the required generation amount in accordance with curve F0 in FIG. 10. As shown in FIG. 10, the fuel supply amount is determined in such a way that it grows monotonically with the increase in required generation amount, but under a required generation amount of approximately 200 W, the fuel supply amount is approximately a fixed value.

When the required generation amount is changed, sudden changes in the fuel supply amount can hasten degradation of the fuel cell module 2, therefore the fuel supply amount is gradually increased or decreased as shown in FIG. 11. FIG. 11 is a graph showing the change in fuel supply amount versus time when the required generation amount is changed in a stepped manner from 500 W to 700 W. As shown in FIG. 11, when the required generation amount is changed from 500 W to 700 W at time t10, the required fuel supply amount is suddenly changed from a fuel supply amount for an output power of 500 W to one corresponding to 700 W. In response, the control section 110 controls the fuel flow rate regulator unit 38 so that the fuel supply amount is increased slowly as shown by the imaginary line in FIG. 11, thereby avoiding a sudden increase in the fuel supply amount. Note that after the initial start of use of the solid oxide fuel cell 1, up until a determination is made that the fuel cell module 2 has degraded, the control section 110 increases the fuel supply amount in accordance with the curve F10 in FIG. 11.

Similarly at time t11, even if the required generation amount changes from 700 W to 500 W, the control section 110 gradually decreases the fuel supply amount as shown by line F10 in FIG. 11 so that there is not a sudden decrease in the fuel supply amount. Note that the rate of change in fuel supply amount is set to be more gradual when increasing the fuel supply amount than when decreasing it.

Note that FIGS. 10 and 11 relate to fuel supply amount, but changes occur similarly in the air supply amount and water supply amount relative to the required generation amount.

Next, at time t1 in FIG. 9, the degradation determining circuit 110a serving as degradation determining means built into the control section 110 starts operation of the degradation determining mode (FIG. 6). Note that the degradation determining circuit 110a comprises a microprocessor, memory, a program for activating same, and the like (none of the above is shown). FIG. 12 is a flow chart showing the process carried out by the degradation determining circuit 110a.

The flow chart shown in FIG. 12 is executed at a regular predetermined time interval by the degradation determining circuit 110a. First, in step S1, a determination is made of time elapsed since the previous degradation determining mode operation. If the predetermined 2 week degradation determining interval has not elapsed since the previous degradation determining mode operation, the system advances to step S9, and one iteration of this flow chart is completed. This process makes it possible to prevent wasting of fuel, etc. caused by unnecessarily frequent execution of the degradation determining mode operation.

If the 2 week degradation determining interval or more has elapsed since the previous degradation determining mode operation, the system advances to step S2, and a judgment is made as to whether the solid oxide fuel cell 1 external environment is in a predetermined degradation determining atmosphere state appropriate to the degradation determining mode operation. Specifically, a determination is made as to whether the outside air temperature and outside air humidity detected by the outside air temperature sensor 150 (FIG. 6) and outside air humidity sensor (not shown) conform to predetermined conditions. In the present embodiment, if the outside air temperature is 5-30° C. and the outside air humidity is 30-70%, the outside environment is judged to be in a degradation determining atmospheric state appropriate to the degradation determining mode operation. If it is judged that the external environment is not in the degradation determination outside atmospheric state, the system advances to step S9, and one iteration of this flow chart is completed.

When the outside environment is suited to the degradation determining mode operation, the system advances to step S3, and the degradation determining mode operation is started. Moreover, in step S4 certain values are fixed for predetermined amounts corresponding to specified degradation determination generating amounts by which the fuel supply amount, air supply amount, and water supply amount are determined in advance. In other words, in the degradation determining mode operation, the degradation determining circuit 110a controls the fuel flow rate regulator unit 38, the generating air flow rate regulator unit 45, and the water flow rate regulator unit 28 to maintain a fixed supply amount irrespective of the required generation amount being requested of the control section 110. At time t1 in FIG. 9 of the present embodiment, the degradation determining fuel supply amount is fixed at 3 L/min, the degradation determining oxidant gas supply amount at 100 L/min, and the degradation determining water supply amount at 8 mL/min.

The fixed values corresponding to these degradation determination generation amounts are the supply amounts corresponding to 700 W, which is the solid oxide fuel cell 1 rated generation amount. Therefore the solid oxide fuel cell 1 has the ability to output 700 W of electrical power while fuel, air, and water are being supplied in these fixed values, but if the required generation amount does not reach 700 W, the extra fuel will not be used for electrical generation, and will be combusted in the combustion chamber 18.

Next, in step S5 of FIG. 12, after operation using fixed values has begun, a judgment is made as to whether sufficient time has elapsed and a stable operating state has been achieved. In the present invention, judgment of a stable operating state is made based on whether the degradation determining time of 5 hours has elapsed after starting of operation based on the degradation determining operating condition fixed values. If the fixed value-based time of 5 hours after start of operation has not elapsed, the step S5 process is repeated. Operation using fixed values started in step S4 is thus maintained over a period of 5 hours (FIG. 9, times t1-t2).

After fixed value-based operation has continued for 5 hours, the system advances to step S6 at time t2 in FIG. 9, and a judgment is made as to whether the temperature of the fuel cell module 2 measured by the generating chamber temperature sensor 142 is equal to or greater than a predetermined temperature. In other words, degradation of the fuel cell module 2 is determined by comparing the temperature of the fuel cell module 2 resulting from operation of the fuel cell module 2 in a stable state with a reference temperature serving as a predetermined degradation determination reference value. In the solid oxide fuel cell 1 of the present embodiment, the reference temperature T0 of the fuel cell module 2 when operated at rated power of 700 W in the initial state is approximately 700° C.; as degradation of the fuel cell module 2 progresses, this temperature rises. This is caused by degradation of the fuel cell units 16 themselves, consisting of fuel cell units, and by joule heating and the like due to increased internal resistance of the fuel cell stack 14 as the result of degradation in the junction portion which electrically connects the various fuel cell units 16.

Note that it is also acceptable to operate the solid oxide fuel cell 1 using a specified fuel supply amount at the time of initial operation of the solid oxide fuel cell 1, using the temperature at this time as the initial reference temperature T0 of the fuel cell units 16 and recording same in the degradation determining circuit 110a. By so doing, accurate degradation determination can be achieved even when there are individual differences in the fuel cell module 2.

In the present embodiment, if the temperature T1 measured by the generating chamber temperature sensor 142 serving as temperature detection sensor is 30° C. or more above the reference temperature T0, the degradation determining circuit 110a determines that a fuel cell module 2 has degraded. If the fuel cell module 2 has not degraded, the system advances to step S10, and one iteration of this flow chart process is completed; no change is made to operating conditions such as fuel supply amount.

If it is determined that a fuel cell module 2 has degraded, the system advances to step S7, and degradation processing by the degradation response circuit 110b serving as a degradation response means built into the control section 110 is started.

Note that the degradation response circuit 110b comprises a microprocessor, memory, a program for activating same, and the like (none of the above is shown). In step S7, a fuel supply correction is executed, and the fuel supply amount and gain in fuel supply amount relative to required generation amount are changed. In other words, if it is first determined that a fuel cell module 2 has degraded after the start of use of the solid oxide fuel cell 1, the fuel supply amount relative to the required generation amount will be changed by fuel supply correction from the curve F0 to the curve F1 in FIG. 10, and thereafter fuel supply amounts will be determined using the curve F1. The rate of change when changing the fuel supply amount is changed from line F10 to more gradual line F11 in FIG. 11, and thereafter the fuel supply amount is changed using this rate of change. The fuel supply amount changed by the fuel supply correction is maintained until it is determined that the fuel cell module 2 has further degraded.

When a fuel cell module 2 degrades, power output relative to the same fuel supply amount declines, so the fuel supply amount is determined by following a curve F1, in which the fuel supply amount is increased by 10% relative to the curve F0, thereby correcting the reduction in output power. A sudden change to the amount of fuel supplied to a degraded fuel cell module 2 can lead to further degradation, therefore the rate of change in the fuel supply amount is made smaller.

Note that if degradation is once again determined to have occurred, the fuel supply amount is changed from the curve F1 to the curve F2; if it is yet again determined to have occurred, there is a change from the curve F2 to the curve F3. The fuel supply amount in curve F2 is increased 18% relative to curve F0, and increased 23% in curve F3 relative to curve F0. Hence there is increase of 10% of an initial fuel supply amount on the first determination of degradation, a further 8% of the initial fuel supply amount on the second determination (for a total of 18%), and a further 5% of the initial fuel supply amount on the third determination (for a total of 23%). Correction of the fuel supply is thus set so that the amount of the fuel increase becomes smaller in later executions. Excessive burden on a fuel cell module 2 in which degradation is progressing can in this way be prevented. The fuel supply amount gain is also changed from line F11 to line F12 on the second degradation determination, and from line F12 to line F13 on the third degradation determination.

Thus in the present embodiment the amount of increase to the fuel supply amount when degradation is determined is a pre-set fixed value. Therefore unlike cases in which, for example, the fuel supply amount correction amount is calculated based on the rise in temperature of a fuel cell module 2 or based on the amount of decline in output power, highly erroneous corrections can be prevented from occurring. That is, the temperature or output power of a fuel cell module 2 are affected by various factors which change their values, so calculating the amount of correction based on these values results in the execution of anomalous corrections when an anomalous temperature or output power is measured due to some factor.

After the fuel supply amount is corrected, the system advances to step S8; in step S8, the temperature T2 of a fuel cell module 2 when the solid oxide fuel cell 1 is operated using the post-correction fuel supply amount is measured by the generating chamber temperature sensor 142. The measured temperature T2 is stored in the degradation determining circuit 110a memory (not shown) as a new reference temperature T0. This new reference temperature T0 is used as the reference temperature for the next degradation determination. In other words, the operating results of a fuel cell module 2 based on the operating conditions changed by the degradation response circuit 110b are stored, and a further degradation determination is executed based on the stored operating results. Operation is preferably carried out with the fuel supply amount held steady for a predetermined time when the degradation response circuit 110b corrects the fuel supply amount; thereafter the temperature T2 of a fuel cell module 2 is measured. This enables accurate temperature measurement which excludes the effects of changes to the fuel supply amount by corrections.

When the degradation processing described above is completed, the degradation determining circuit 110a ends the degradation determining mode operation, and the control section 110 resumes normal operation responsive to the required generation amount (FIG. 9, time t2).

Moreover, if a user of the solid oxide fuel cell 1 is using more electrical power than the solid oxide fuel cell 1 rated power, the required generation amount sent to the control section 110 from the inverter 54 will become the solid oxide fuel cell 1 rated power. If this type of condition continues over a long time period it will result in the amounts of fuel, air, and water to a fuel cell module 2 becoming fixed values corresponding to the rated power over a long time period (FIG. 9, times t3-t4).

The degradation determining circuit 110a executes degradation determination even when such a stable operating state continues for the degradation determining time of 5 hours or more. That is, the degradation determining circuit 110a compares the temperature T1 measured by the generating chamber temperature sensor 142 with the reference temperature T0 at time t4 in FIG. 9 and determines if the temperature T1 is 30° C. or more above the reference temperature T0. Note that the reference temperature T0 is a temperature which was measured, updated, and stored immediately after the previous change in fuel supply amount. If the temperature T1 is 30° C. or more above the updated reference temperature T0, the degradation determining circuit 110a determines the degradation of a fuel cell module 2 has progressed even more, and changes operating conditions to correct this degradation. When this is the second determination of degradation, the fuel supply amount is changed from curve F1 to curve F2, and the fuel supply amount gain is changed from the line F11 to the line F12.

However, even if degradation has been determined to have occurred, no correction of the fuel supply amount is executed unless the 0.5 year predetermined minimum correction period has elapsed since the previous fuel supply correction. This prevents a situation in which excessive fuel supply correction is executed in a short time period so that degradation of a fuel cell module 2 proceeds faster than anticipated.

In addition, the degradation determining circuit 110a starts the degradation determining mode operation at time t5 in FIG. 9. In this degradation determining mode operation, the supplies of fuel, air, and water are fixed at a supply amount corrected by the degradation determination. In other words, when it is determined that the fuel cell module 2 has degraded twice in the past, the fuel supply is fixed at an amount corresponding to the rated output, which is determined based on the curve F2 in FIG. 10.

The degradation determining circuit 110a measures the fuel cell module 2 temperature T1 at time t6, 5 hours after the start of degradation determining mode operation, and performs a degradation determination. At this point, if there is a determination that the fuel cell module 2 has degraded, and this is the third determination of degradation, the fuel supply amount is changed from curve F2 to curve F3, and the fuel supply amount gain is changed from line F12 to line F13. Note that when the measured fuel cell module 2 temperature T1 exceeds the predetermined correction prohibition temperature of 900° C., the degradation determining circuit 110a does not execute a correction of the fuel supply amount even if a degradation of the fuel cell module 2 has been determined.

If there is further degradation and a determination of degradation is made a fourth time, the degradation response circuit 110b stops the operation of the solid oxide fuel cell 1 without executing further corrections to the fuel supply amount or the like. In other words, when a fuel supply amount correction to correct the amount of fuel supplied, etc. has been executed a predetermined number of correction iterations, which is up to 3, when the next time there is a determination that the fuel cell module 2 has degraded operation of the solid oxide fuel cell 1 will be stopped. The degradation determining circuit 110a sends a signal to the warning device 116 to inform users that the solid oxide fuel cell 1 has reached its expected life. This prevents wasting of fuel by use of a solid oxide fuel cell 1 whose generating efficiency has fallen due to advancing degradation.

In addition, when output power relative to a pre-set specified fuel supply amount falls below a predetermined power, the degradation determining circuit 110a will stop operation of the solid oxide fuel cell 1 and notify the user that the product has reached its expected life, even if this precedes a fourth determination of degradation.

In the solid oxide fuel cell of the present embodiment of the invention, the operating results of the fuel cell module whose operating conditions were changed by the degradation response circuit are stored, and a further degradation determination is made based on those stored results, therefore the degradation determining circuit can determine degradation over multiple iterations. This makes it possible to appropriately change operating conditions to fit the degradation state, and thereby maintain performance over a long time period.

Also, in the solid oxide fuel cell of the present embodiment of the invention, the degradation determining circuit determines fuel cell module degradation based on the temperature of fuel cell units when operated in predetermined degradation determining operating conditions, therefore false determinations of degradation can be prevented.

Furthermore, in the solid oxide fuel cell of the present embodiment, the degradation determining circuit stores the temperature of the fuel cell units as operating results and executes further fuel cell module degradation determinations based on this temperature, therefore the degree to which the fuel cell module degradation has progressed can be appropriately known.

In the solid oxide fuel cell of the present embodiment, the first fuel cell module degradation determination is executed based on an initial fuel cell reference temperature, therefore an accurate degradation determination can be made even when there are individual differences in the fuel cell module.

Furthermore, in the solid oxide fuel cell of the present embodiment, the degradation determination is executed after a predetermined degradation determining time has elapsed, therefore the degradation determination can be executed in a stable fuel cell module operation state, and an accurate degradation determination performed.

In the solid oxide fuel cell of the present embodiment, degradation determination have occurred when a condition selected from among outside air temperature, outside air humidity, and time of day, along with the amount of fuel supplied, satisfy predetermined conditions, therefore negative influence on the degradation determination from environmental factors can be avoided.

In the solid oxide fuel cell of the present embodiment, the degradation determination reduces the rate of change per hour in the amount of fuel supplied, therefore burdening of fuel cell units placed by sudden changes in fuel supply amount can be prevented.

In the above-described embodiment, a fuel supply amount correction was executed when the degradation determining circuit determined a single instance of fuel cell degradation, but it would also be acceptable as a variation for correction of the fuel supply amount to be executed when the degradation determining circuit made multiple continuous determinations of degradation, or when the degradation determining circuit determined that the fuel cell module had been continuously degraded during a predetermined time period.

In the above-described embodiment, the reference temperature was updated and a further determination of fuel cell module degradation made based on this reference temperature after the fuel supply amount correction was executed, but it would also be acceptable as a variation to store as operating results the output power detected by the electrical power state detecting sensor 126 serving as electrical power detection sensor after correction of the fuel supply amount is executed, then make a further determination of fuel cell module degradation based on this output power.

In this variation, the degradation determining circuit determines fuel cell module degradation based on fuel cell module output power when operated in predetermined degradation determining operating conditions, therefore the accuracy of degradation determinations can be improved. Also, by determining fuel cell module degradation based on temperature and output power, degradation determination accuracy can be further improved. By determining degradation based on output power after the degradation determining circuit has operated at a fixed fuel supply amount, degradation determination accuracy can be improved. In addition, by storing output power under post-correction operating conditions and making a further determination of degradation after the fuel supply amount is corrected, multiple iterations of degradation determination can be carried out, while false determinations are prevented.

When the temperature of the fuel cell unit reaches a predetermined maximum temperature, the control section carries out the following controls, treating the output power corresponding to this maximum temperature as the rated output power. By applying this subsequent control treating the electrical power output at maximum temperature as the rated output power, operation exceeding the maximum temperature is avoided, and promotion of degradation of the fuel cell units can be prevented.

Although we have explained an embodiment of the present invention above, a variety of variations can be added to the above-described embodiment. In particular, in the above-described embodiment the solid oxide fuel cell was constituted to change the output power in response to the required generation amount, but the present invention can be applied to a solid oxide fuel cell in which a fixed rated output power is output constantly.

EXPLANATION OF REFERENCE NUMERALS

1: Solid oxide fuel cell (SOFC)
2: Fuel cell module
4: Auxiliary unit
8: Sealed space
10: Electrical generating chamber
12: Fuel cell assembly
14: Fuel cell stack
16: Fuel cell unit (solid oxide fuel cells)
18: Combustion chamber
20: Reformer
22: Heat exchanger for air
24: Water supply source
26: Pure water tank
28: Water flow rate regulator unit (water supply device; water supply means)
30: Fuel supply source
38: Water flow rate regulator unit (fuel supply device; fuel supply means)
40: Air supply source
44: Reforming air flow rate regulator unit
45: Generation air flow rate regulator unit (oxidant gas supply device; oxidant gas supply means).
46: First heater
48: Second heater
50: Hot water production device
52: Control box
54: Inverter
83: Ignition device
84: Individual fuel cells
110: Control section (controller)
110a: Degradation Determining Circuit (degradation determining means)
110b: Degradation response circuit (degradation response means)
112: Operating device
114: Display device
116: Warning device
126: Electrical power state detecting sensor (electrical power detecting sensor)
142: Generating chamber temperature sensor (temperature detecting sensor)
150: Outside air temperature sensor

The invention claimed is:

1. A solid oxide fuel cell system comprising:
a fuel cell module comprising multiple fuel cell units;
a fuel supply device that supplies fuel to the fuel cell module;
an oxidation gas supply device that supplies oxidation gas to the fuel cell module; and
a controller programed to control a fuel supply from the fuel supply device in response to a demand for electricity to control operation of the fuel cell module;
wherein the controller comprises
(i) a degradation determining circuit programed to execute a degradation determination at intervals in which the degradation determining circuit obtains a measurement value regarding the operation of the fuel cell module and compares the obtained measurement value with a stored reference measurement value to determine degradation of the fuel cell module, and
(ii) a degradation response circuit programed to change an operation condition for operating the fuel cell module if the degradation determining circuit determines in a last execution of the degradation determination that the fuel cell module has degraded, whereas leaving the operation condition unchanged if the degradation determining circuit determines in the last execution of the degradation determination that the fuel cell module has not degraded, wherein changing the operation condition for operating the fuel cell module comprises changing a fuel supply function which defines a relationship between the demand for electricity and the fuel supply from the fuel supply device that meets the demand for electricity; and
wherein the degradation determining circuit programed to perform, if it determines in the last execution of degradation determination that the fuel cell module has degraded, a reference measurement value update in which the degradation determining circuit obtains a new measurement value while the fuel cell module is operated under the operation condition changed by the degradation response circuit, and store the new measurement value as the reference measurement value for a next execution of degradation determination, and
the degradation determining circuit is further programed to dispense with performing the reference measurement value update and leave the stored reference measurement value unchanged for the next execution of degradation determination if it determines in the last execution of the degradation determination that the fuel cell module has not degraded.

2. The solid oxide fuel cell system of claim 1, further comprising a temperature detection sensor that detects a temperature of the fuel cell units, wherein the measurement value regarding the operation of the fuel cell module comprises the temperature of the fuel cell units detected by the temperature detection sensor, and the degradation determining circuit is programed to determine degradation in the fuel cell module based on the temperature of the fuel cell units which is detected when the solid oxide fuel cell system is operated in a predetermined degradation determining condition.

3. The solid oxide fuel cell system of claim 1, further comprising a power detecting sensor that detects output power from the fuel cell module, wherein the measurement value regarding the operation of the fuel cell module comprises the output power from the fuel cell module detected by the power detecting sensor, and the degradation determining circuit is programed to determine degradation in the fuel cell module based on the output power from the fuel cell module which is detected when the solid oxide fuel cell system is operated in a predetermined degradation determining condition.

4. The solid oxide fuel cell system of claim 2, wherein the degradation determining circuit is programed to store the detected temperature of the fuel cell units as the reference measurement value and determine degradation of the fuel cell module based on the stored temperature.

5. The solid oxide fuel cell system of claim 2, wherein the degradation determining circuit is programed to store a reference temperature as the reference measurement value, which is the temperature of fuel cell units detected when the solid oxide fuel cell system is operated in the predetermined degradation determining condition during an initial operation of the fuel cell module, and determines degradation of the fuel cell module based on this stored reference temperature.

6. The solid oxide fuel cell system of claim 1, wherein the degradation response circuit is programed to change the operation condition for operating the fuel cell module if the degradation determining circuit determines degradation of the fuel cell module continuously at a predetermined number of times or over a predetermined time period.

7. The solid oxide fuel cell system of claim 1, wherein the degradation determining circuit is programed to determine degradation of the fuel cell module a predetermined time period after the degradation response circuit changed the operation condition for operating the fuel cell module.

8. The solid oxide fuel cell system of claim 1, wherein the degradation determining circuit is programed to store the measurement value when the degradation response circuit changes the operation condition for operating the fuel cell module, the stored measurement value comprises an output power from the fuel cell module which is detected when the fuel cell module is operated under the changed operation condition, and the degradation determining circuit is further programed to determine degradation of the fuel cell module degradation based on the stored output power.

9. The solid oxide fuel cell system of claim 1, wherein the controller is programed to define, when the fuel cell units reach a predetermined maximum temperature, that an electrical power output outputted at the maximum temperature is a maximum rated electrical power output from the fuel cell module.

10. The solid oxide fuel cell system of claim 1, wherein the degradation determining circuit is programed to determine that the fuel cell module has degraded when a combination of an amount of fuel supplied by the fuel supply device and at least one of the following parameters satisfies a predetermined condition:
   (i) an outside air temperature;
   (ii) an outside air humidity; and
   (iii) a time of day.

11. The solid oxide fuel cell of claim 1, wherein the controller is programed to reduce a maximum change rate of the fuel supply by the fuel supply device, after the degradation determining circuit determines that the fuel cell module has degraded.

* * * * *